United States Patent [19]

Butchkov et al.

[11] Patent Number: 4,822,409
[45] Date of Patent: Apr. 18, 1989

[54] METHOD FOR THE MANUFACTURE OF A THERMOSTABLE AMORPHOUS FERROMAGNETIC POWDER

[75] Inventors: Dimiter T. Butchkov; Yovka D. Dragieva; Zvetan K. Nikolov; Georgi G. Georgiev; Mina S. Slavtcheva-Staikova; Ivanka S. Grozdanova, all of Sofia, Bulgaria

[73] Assignee: VMEI Lenin, Quartal Darvenitza, Sofia, Bulgaria

[21] Appl. No.: 171,989

[22] Filed: Mar. 23, 1988

Related U.S. Application Data

[62] Division of Ser. No. 913,786, Sep. 30, 1986.

[51] Int. Cl.$^4$ .............................................. B22F 9/24
[52] U.S. Cl. .............................................. 75/0.5 AA
[58] Field of Search ................... 75/0.5 AA; 198/304, 198/403

[56] References Cited

U.S. PATENT DOCUMENTS

| | | | |
|---|---|---|---|
| 3,966,510 | 6/1976 | Aonuma et al. | 75/0.5 AA |
| 4,063,000 | 12/1977 | Aonuma et al. | 75/0.5 AA |
| 4,069,073 | 1/1978 | Tadokoro et al. | 75/0.5 AA |
| 4,101,311 | 7/1978 | Aonuma et al. | 75/0.5 AA |
| 4,141,763 | 2/1979 | Aonuma et al. | 75/0.5 AA |
| 4,331,489 | 5/1982 | Vehori et al. | 75/0.5 AA |
| 4,349,380 | 9/1982 | Pytlewski et al. | 75/0.5 AA |

Primary Examiner—Wayland Stallard
Attorney, Agent, or Firm—Klein & Vibber

[57] ABSTRACT

The thermostable amorphous ferromagnetic powder containing iron, cobalt, or nickel, also comprises xylene for 0.2 to 25% by volume of the powder particles, up to 20% chrome and boron by weight, and lithium or magnesium in amounts from 0.1 to 2.0% by weight. The powder is resistant to oxidizing up to temperatures of 250° C. and has a specific surface up to 160m$^2$/g.

The method for its manufacture comprises reduction of a solution containing salts of iron, cobalt, chrome, a complexing agent, and metal salts or polyvalent alcohols by means of a reductant sodium borohydride in the presence of sodium hydroxide. The solution is protected by an organic hydrophobic substance - xylene during a period from 5 seconds to 10 minutes in the presence of a magnetic field.

The device for manufacture of the thermostable amorphous ferromagnetic powder comprises a vertical reactor with a stirrer and electromagnet generating a magnetic field. The reactor is cylindrical with a movable bottom and tubes are oriented vertically to the bottom. The reaction vessel is connected by two overflow tubes to an expanded collecting vessel. Both vessels have belts for shower jet washing with water for discontinuation of the the reaction and after its cessation.

The ferromagnetic powder is used in the manufacture of magnetic media recording on disks, tapes and cards, etc.

2 Claims, 1 Drawing Sheet

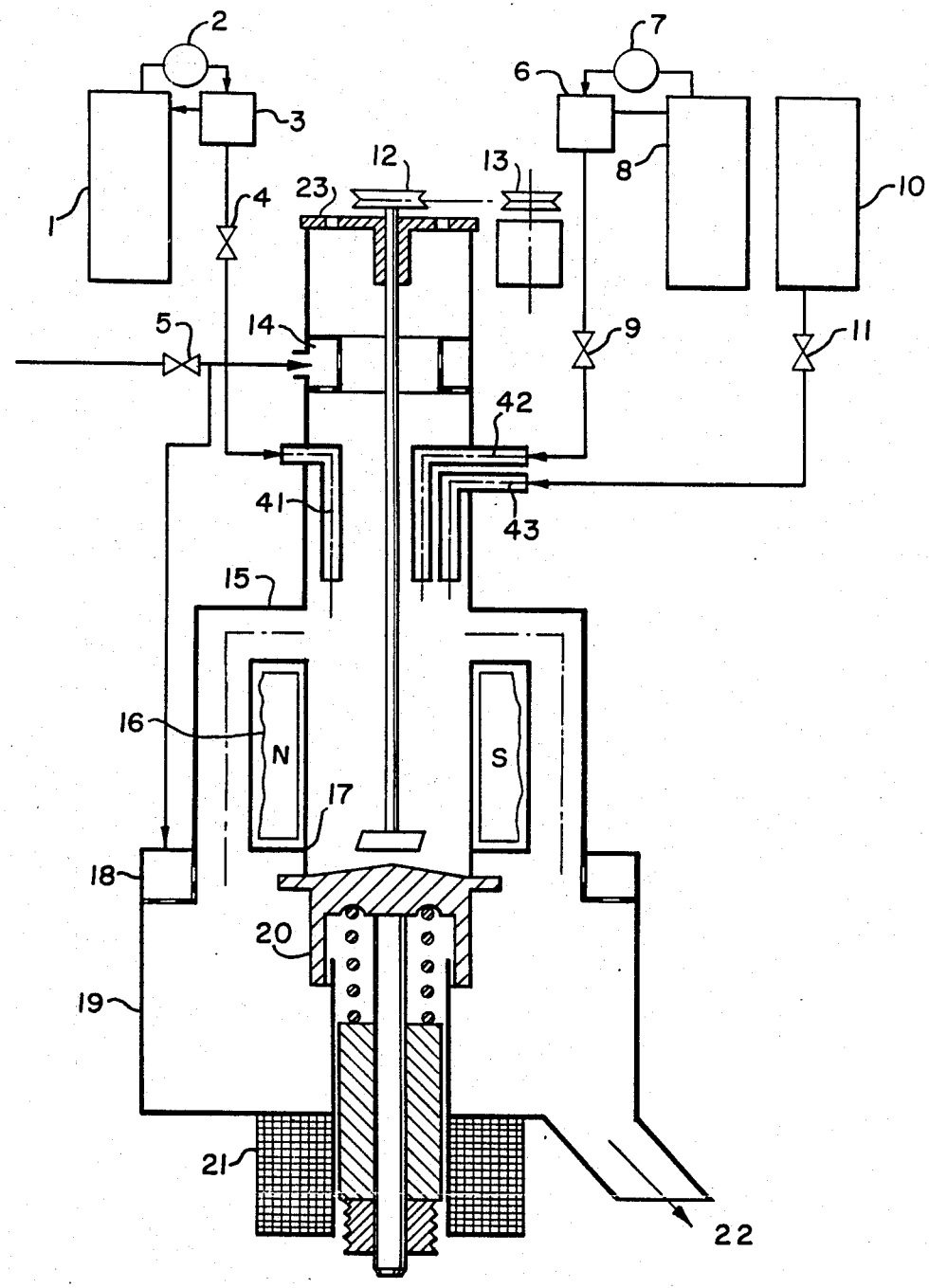

METHOD FOR THE MANUFACTURE OF A THERMOSTABLE AMORPHOUS FERROMAGNETIC POWDER

This application is a divisional application of our co-pending application Ser. No. 913,786, filed Sept. 30, 1986.

This invention is related to co-pending, co-assigned application Ser. No. 913,795, filed Sept. 30, 1986 for Method for the Production of Magnetic Powders Containing Rare Earth Elements, the disclosure of which is incorporated herein by reference.

FIELD OF THE INVENTION

The invention relates to a thermostable amorphous ferromagnetic powder, and a method and device for its manufacture. The powder is suitable for use in the production of magnetic media in the form of disks, tapes, cards, etc. for analog and digital recording of data as well as for use in other applications of magnetic material.

BACKGROUND OF THE INVENTION

A known magnetic powder, disclosed in Peter Rohtgens, *Funkshau*, 1980, H.12, pgs.85-88, is composed of gamma ferric oxide, chromic dioxide, ferric oxide alloyed with cobalt, etc. A disadvantage of the oxide powders and magnetic media produced thereof is that they are limited in the density of magnetic information which they can receive.

An increase in density of information recorded on magnetic media is achieved by the use of metal magnetic powders as disclosed in *Funkshau*, 1978 H.17, pgs.819'821. A disadvantage of these metal powders is that they are easily oxidized and that their magnetic parameters deteriorate. As a result, magnetic media made of metal powders require additional processing including different coatings of surface active substances.

Another know method for manufacturing metal magnetic powder, as disclosed in IEEE Trans On Magn., 1972, Vol.5, p.430; Journal of Audio Eng. Soc., 1978, 26, Nr.1, Pgs. 838-842, is by reduction of oxide and hydroxide compounds of iron in hydrogen current. Other methods of little practical value include decomposition of iron-organic compounds by heating (see V.G. Sirikin, *Karbonilnie Metalli*, Moscow Metalurgia, 1978, pg.112), electric precipitation of ferromagnetic metals on a mercury cathode and subsequent separating of mercury (see IEEE Trans. 0n Magn. 1968, Vol.4, pgs.821-839), preparing metal magnetic powder by evaporation in inert gas current (see J. Crystal Growth, 1978, 45, pgs. 495-500; Japanese Journal of Applied Physics, 1978 Vol.17, pgs. 355-359). Another method which has proven its advantage, as disclosed in U.S. Pat. No. 4,101,311 and U.S. Pat. No. 4,020,236, is reduction of ferromagnetic salts in solution using reductants of the type of hypophosphites, borohydrides, aminoboranes, hydrazines and the like. A disadvantage of all of these methods, however, including the last mentioned method, is that it is not possible to manufacture metal powder which is thermostable up to 220-250° C., the temperature for producing magnetic coatings on nonflexible disks. In all of the known methods, additional operations are required for processing the metal powder (see U.S. Pat. No. 3,966,510, U.S. Pat. No. 4,063,000 and U.S. Pat. No. 4,069,073). This leads to a substantial reduction of the specific surface. Metal powders manufactured according to these known methods cannot be used for high temperature varnish systems while the reduced powder surface leads to a reduction of the recording density on the coatings prepared by means of such powders.

A known device for carrying out the process of reducing ferrosalts by borohydride in a continuously working solution is disclosed in U.S. Pat. No.4,141,763. The device is characterized by the use of vertical reactors (tubes) so that the reacting solutions are fed under pressure and the chemical reaction takes place in the upper part of the reactor under conditions of free fall of the produced particles. A magnetic field is created at the point of mixing of the reacting solutions and it is disposed along the length of the reaction tube such that the produced particles are exposed for about 5 seconds or less. A basic shortcoming of this known device is that the process takes place in a medium which is not protected from air and the powder may become partially oxidized. It is not possible to modify the essential technology disclosed in this known device without changing the dimensions of the reactor and the length of the magnetic field. This disadvantage in design limits the flexibility of the process.

SUMMARY OF THE INVENTION

It is an object of the present invention to provide an amorphous thermostable ferromagnetic powder, and a method and device for its manufacture so that the powder is thermoresistant, stable to oxidation at temperatures up to 250° C. in coating and possessing a specific surface up to $160 m^2/g$, whereby the process may proceed automatically and produce powder in commercial quantity.

This object is acieved by a thermostable amorphous ferromagnetic powder based on iron, cobalt, nickel, chrome and boron which also contains xylene from 0.2 to 25 % by volumeof powder particles, and lithium or magnesium from 0.01 to 2.0 % by weight.

The thermostable amorphous ferromagnetic powder is prepared by reduction of a solution containing salts of iron, cobalt, nickel, chrome, complex-forming agents, metal salts or polyvalent alcohols by using sodium borohydride in the presence of sodium hydroxide as the reductant. The solution is protected by an organic hydrophobic substance-xylene. The reduction is caried out for a period of time lasting 5 seconds to 10 minutes, in the presence of a magnetic field.

The device comprises a cylindrical reaction vessel with a movable bottom and three tubes directed vertically to the bottom through which the reaction solutions are fed. The reaction vessel is connected by two overflow tubes to an expanding collecting vessel. Both vessels are provided with belts for shower jet washing with water for terminating and after ceasing the reaction.

The advantages of the present invention include:

An amorphous ferromagnetic powder that is thermostable up to 250° C. having a specific surface up to $160 m^2/g$ whereby supplementary operations for protection of the powder surface are not needed. The device permits modifications in the time periods, volumes, rate of feeding, reactions solutions, discontinuation and effective washing of the reactor without any change in the size of the reactor.

BRIEF DESCRIPTION OF THE DRAWING

With these and other objects in view, which will become apparent in the following detailed description, the present invention, which is shown by example only, will be clearly understood in connection with the accompanying drawing, in which:

The single figure is an exemplary schematic diagram of the device for manufacture of thermostable amorphous ferromagnetic powder.

DETAILED DESCRIPTION OF THE DRAWINGS

Referring to the drawing, the device of the invention comprises a cylindrical reaction vessel 17 which is connected via overflow tubes 15 to an expanded collecting vessel 19. The vessel 17 is provided with a movable bottom 20 with a controllable pressing face and a stirrer 12 driven by a variable speed motor 13. The reaction vessel 17 has three inlet tubes 41, 42, 43 for feeding of reaction solutions. Inlet tube 41 is connected by an electromagnetic valve 4 to a dosing receiver 3 which is charged with a solution from reservoir 1 by means of a pump 2, by electromagnetic valve 9 to dosing vessel 6 which is charged with a solution from reservoir 8 by means of pump 7. Inlet tube 43 is connected by electromagnetic valve 11 to reservoir 10. Belts 14 and 18 with apertures for shower washing with water are connected to a source of water by eleotromagnetic valve 5. At the top of the vessel there are openings 23 for the evacuation of gases formed during the reaction. A magnetic field is provided by electromagnet 16. The opening of bottom 20 is carried out by electromagnet 21. The finished product flows out of the vessel through aperture 22. The device is operated automatically in the following manner:

In the initial stage, the reaction vessel is empty, clean and with its bottom closed. The electromagnetic valves 4, 5, 9, and 11 are closed. The dosing vessels 3 and 6 are charged by pumps 2 and 7 from reservoirs 1 and 8. A signal to electromagnetic valves 4 and 11 empties the contents of dosing vessel 3 and a determined volume of reservoir 10 into the reaction vessel 17. Stirrer 12 then activated by motor 13 and the magnetic field of electromagnet 16 which is also activated. The electromagnetic valve 9 is opened and the contents of dosing vessel 6 is poured at a determined rate into vessel 17 where a chemical reaction is then started. The gases formed in this reaction are removed through openings 23. The increase in level due to ample forming of foam is limited by tubes 15 which serve as overflow tubes. The overflow product runs down into collecting vessel 19. After the expiration of a preset time, the magnetic field of electromagnet 16 and the movement of stirrer 12 are switched off. The electromagnet 21 is activated to open the bottom 20 and the product thus obtained flows out into vessel 19 from where, through aperture 22 it proceeds to subsequent treatment. At the same time, electromagnetic valve 5 is also opened and, via belts 14 and 18 a shower washing of the reaction vessel 17, tubes 15 and collecting vessel 19 is effected. After washing, the movable bottom 20 is closed and the process is repeated according to the same cycle.

By multiple practical applications of the device according to the invention it is possible to produce metal powder in amounts up to 200 g or more per hour.

The powder of the present invention is manufactured by means of the device described above according to the following method:

EXAMPLE 1

Into the reactor are introduced chlorides of iron —15 g/l, of nickel —3g/l of chrome 0.25g/l, lactic acid (80%)—5ml/l and magnesium sulphate 0.2g/ l. A magnetic field with an intensity of 1000 Oe is activated, xylene in amounts up to 25% by volume of the total working solution is added and the stirrer is activated. The solution of the reductant - sodium borohydride 10g/l with sodium hydroxide 2.4g/l and water is added automatically at the preset time through the electromagnetic valve 9.

After a determined period of time, in this case 1 minute, the reaction is discontinued and the obtained powder is collected in vessel 19 and form there it is conducted away for washing and drying. The, metal amorphous powder thus produced has a corecitive force of 800 Oe, a specific surface of $125 m^2/g$ and it is thermostable up to a temperature of 250° C. in manufacturing a magnetic medium for recording.

EXAMPLE 2

In the device described in Example 1 magnetic powder from the following components is produced: iron chloride —15g/l, cobaltic chloride —3g/l, chromic chloride —0.25g/l, lactic acid (80%) —5ml/l, glycerine —5ml/l, and lithium chloride —0.1g/l. The sequence of operations for the manufacture of the powder is the same as in Example 1.

The powder produced has a corecitive force of 650 Oe, a specific surface of $95 m^2/g$ and it is thermostable up to 250° C. in the manufacture of magnetic media for recording.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A method for the manufacture of thermostable amorphous ferromagnetic powder comprising the steps of
    preparing a first solution containing salts of iron, cobalt, nickel and chrome, lithium and magnesium, and complex-forming agents, as well as polyvalent alcohols,
    adding to said first solution, consisting in the form of salt lithium and magnesium in amounts of 0.01 to 2.0% by weight of the powder, an organic hydrophobic substance -xylene- in amounts 0.2 to 25% by volume of the powder particles,
    reducing said second solution by means of sodium borohydride as reductant in the presence of sodium hydroxide, at ambient temperature for a time period of 5 seconds to 10 minutes in the presence of a magnetic field.

2. A method according to claim 1 wherein the magnetic field has an intensity of approximately 1000 Oe.

* * * * *